United States Patent [19]

Sheridon et al.

[11] Patent Number: 4,524,371

[45] Date of Patent: Jun. 18, 1985

[54] MODULATION STRUCTURE FOR FLUID JET ASSISTED ION PROJECTION PRINTING APPARATUS

[75] Inventors: Nicholas K. Sheridon, Saratoga; Michael A. Berkovitz, Woodside, both of Calif.

[73] Assignee: Xerox Corporation, Stamford, Conn.

[21] Appl. No.: 481,132

[22] Filed: Apr. 1, 1983

[51] Int. Cl.[3] .......... G01D 15/06

[52] U.S. Cl. .......... 346/159

[58] Field of Search .......... 346/159; 250/325, 326, 250/426; 361/229, 230

[56] References Cited

U.S. PATENT DOCUMENTS

| | | | |
|---|---|---|---|
| 3,715,762 | 2/1973 | Magill et al. | 346/74 ES |
| 3,725,951 | 4/1973 | McCurry | 346/74 ES |
| 3,742,516 | 6/1973 | Cavanaugh et al. | 346/74 R |
| 3,978,492 | 8/1976 | Simm | 346/74 J |
| 4,353,970 | 10/1982 | Dryczynski et al. | 346/159 X |
| 4,463,363 | 7/1984 | Gundlach et al. | 346/159 |

FOREIGN PATENT DOCUMENTS

| | | |
|---|---|---|
| 0099243 | 1/1984 | European Pat. Off. . |
| 1156055 | 6/1969 | United Kingdom . |

OTHER PUBLICATIONS

Patent Abstracts of Japan, vol. 4, No. 160, Nov. 8, 1980, p. 53P35, JP-A-55-106473, (Translation).

*Primary Examiner*—Thomas H. Tarcza
*Attorney, Agent, or Firm*—Serge Abend

[57] ABSTRACT

A fluid jet assisted ion projection printing apparatus having a housing including ion generation and ion modulation regions. A bent path channel, disposed through the housing, directs transport fluid with ions entrained therein adjacent an array of modulation electrodes which control the passage of ion beams from the apparatus. The modulation electrodes are supported upon a planar substrate, and include a first portion, extending in the plane of the substrate, and a second portion, departing from the plane of the substrate by an angle of less than 45°. The width of the bent channel is chosen to provide laminar flow therethrough so that ions will not be lost to the channel walls as the transport fluid negotiates its way along the bent path.

5 Claims, 10 Drawing Figures

MODULATION STRUCTURE FOR FLUID JET ASSISTED ION PROJECTION PRINTING APPARATUS

This inveniton relates to the use of an easily fabricated, low cost, modulation electrode array of flat or nearly flat electrodes in a fluid jet ion printing apparatus. The ions are are moved through the appartus, from the ion generation region to the ion modulation region, within a bent channel, dimensionned to insure a laminar flow stream of the transport fluid therethrough.

In two copending patent applications, assigned to the same assignee as the present patent application, there are disclosed different forms of a fulid jet assisted ion projection printing apparatus. In U.S. Pat. No. 4,463,363 in the names of Robert W. Gundlach and Richard L. Bergen and entitled "Fluid Jet Assisted Ion Projection Printing", there is taught a DC air breakdown form of ion generator. In U.S. Ser. No. 471,380 filed on Mar. 2, 1983 in the name of Nichols Keith Sheridon and entitled "Fluid Jet Assisted Ion Projection and Printing Apparatus", there is taught an RF air breakdown form of ion generator.

Each of the copending patent applications disclose the unique, fluid jet assisted, high resolution ion projection printing apparatus. Ions are uniformly generated along the length of each device and are carried by the rapidly moving transport fluid through an exit channel within which a modulation electrod array is located. The channels are simple, straight-through paths extending from the ion generator of each, to the exterior of the apparatus. By selectively controlling the low votage bias on the modulation electrodes, narrow ion "beams", of sufficient current density for marking purposes, may be selectively placed upon a charge receptor surface. The modulation electrodes are formed over an edge of an insulating support structure. Thus, there is a sharp 90° bend in the conductive electrode elements comprising the modulation circuitry. Photofabrication procedures for depositing extremely narrow conductive lines around a 90° bend are very difficult and become increasingly more complex as the output resolution is increased. For example, in the case of a 400 line/inch resolution, modulation electrodes would be on the order of about 1 mil wide. Feature sizes that small could easily break around such a sharp corner, causing discontinuities to appear in the printed output or requiring expensive and time consuming repair.

Therefore, it is an object of the present invention to provide an improved modulation array, for a fluid jet assisted ion projection printer, which would be simpler and less expensive to fabricate and also more reliable.

It is also an object of this invention to provide a modulation electode array and its associated interconnection and/or control circuitry upon an insulating support surface, wherein there are no abrupt corners over which the conductive electrodes must pass.

It is another object of this invention to utilize the improved modulation structure without incurring a substantial reduction in ion output current.

The present invention may be carried out, in one form, by providing a fluid jet assisted ion projection printing apparatus having a housing within which are ion generation and ion modulation regions. A source of ionizable transport fluid, such as air, is connected to the housing to pass to fluid over and past the ion generation region. Between the ion generation region and the ion modulation region, the housing contains a narrow bent path channel for directing the transport fluid, and ions entrained therein, adjacent an array of modulation electrodes, disposed upon a planar subsrate, the electrodes including a first portion, extending in the plane of the substrate, and a second portion departing from the plane of the substrate by an angle of less than 45°. The channel width is chosen to provide laminar flow therethrough so that ions will not be lost to the channel walls as the transport fluid negotiates its way along the bent path.

Other objects and further features and advantages of this invention will be apparent from the following more particular description considered together with the accompanying drawings, wherein.

Figure 1:
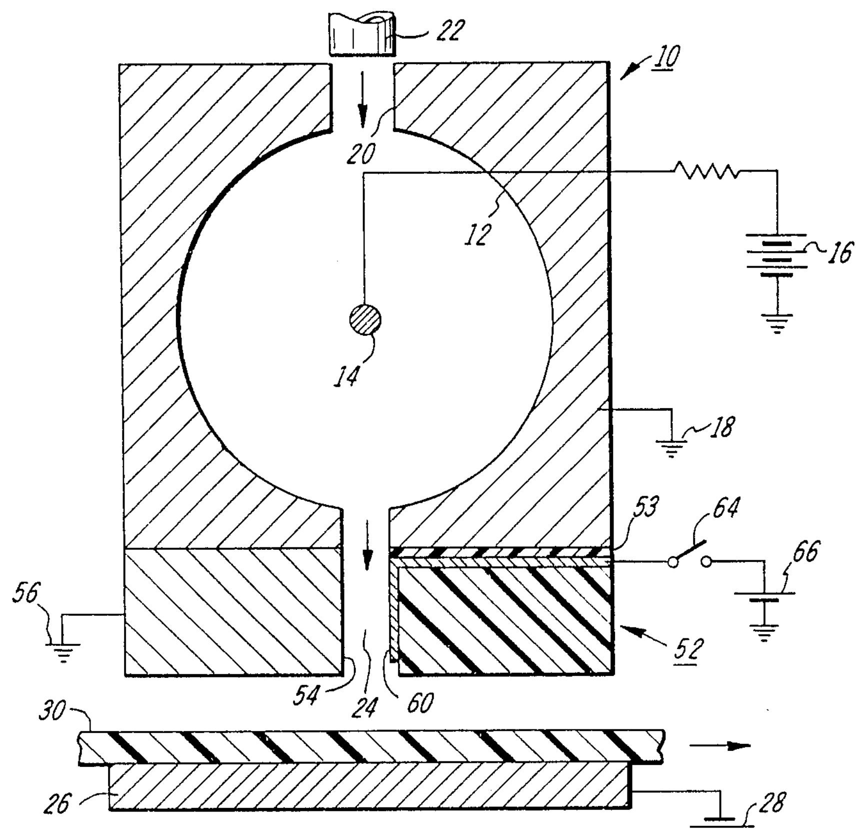
FIG. 1 is a partial cross-sectional elevation view showing one form of the prior fulid jet ion printing apparatus.

With particular reference to the drawings, there is illustrated in FIG. 1 the housing 10 of the fluid jet ion printing apparatus of assignee's U.S. Pat. No. 4,463,363. Within the housing 10 is an ion generation region including an electrically conductive cylindrical chamber 12, a corona wire 14, extending substantially coaxially in the chamber, a high potential source 16, on the order of several thousand volts DC, applied to the wire 14, and a reference potential source 18, such as ground, connected to the chamber 12. An axially extending inlet channel 20 delivers pressurized transport fluid (preferably air) into the chamber 12 from a suitable source, schematically represented by the tube 22. Axially extending outlet channel 24 conducts the transport fluid from the corona chamber 12 to the exterior of the housing 10 in a straight through path, past an ion modulation region. As the transport fluid exits the chamber 12, and enters outlet channel 24, it entrains a number of ions and moves them straight through the ion modulation region.

Those ions allowed to exit the outlet channel 24 come under the influence of accelerating backing electrode 26 which is connected to a high potential source 28, on the order of several thousand volts DC, of a sign opposite to that of the corona source 16. A charge receptor 30 moves over the backing electrode 26 and collects the ions upon its surface.

Figure 2:
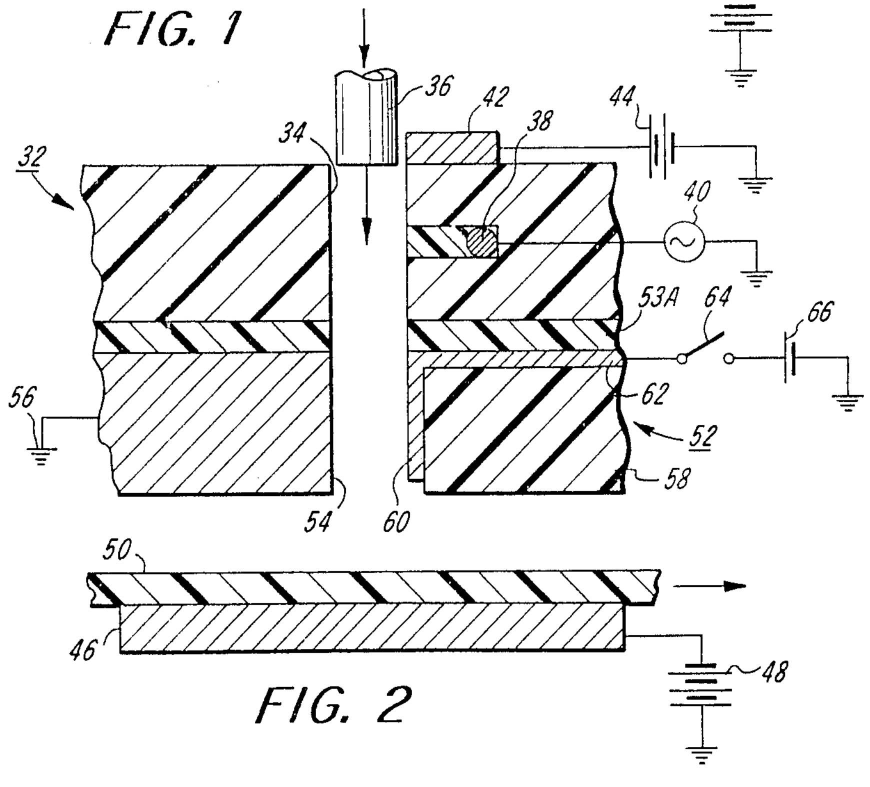
FIG. 2 is a partial cross-sectional elvation view showing another form of the prior fluid jet ion printing apparatus.

In FIG. 2, there is illustrated the fluid jet ion printing apparatus of assignee's copending U.S. patent application bearing Ser. No. 471,380. It comprises a housing 32 having a channel 34 passing completely therethrough in a straight course. A source of pressurized transport fluid, schematically represented by the tube 36 delivers an air jet through the channel. Adjacent the channel 34 is an upstream ion generation region where ions of both signs (+) and (−) are generated by means of a series of RF arc discharges occurring between a buried RF electrode 38, connected to a high voltage RF source 40, and an exposed field electrode 42, connected to a suitable DC reference potential source 44. A downstream ion modulation region adjacent the channel 34 controls the outflow of ion "beams" from the housing 32.

Ions allowed to pass completely through and out of the housing 32, come under the influence of accelerating backing electrode 46, connected to high potential source 48, which is on the order of several thousand volts DC and may be of either polarity, depending upon whether it is desired to deposit (+) or (−) ions. A charge receptor 50 moves over the backing electrode 46 for collecting the selected ions upon its surface.

Figure 3:
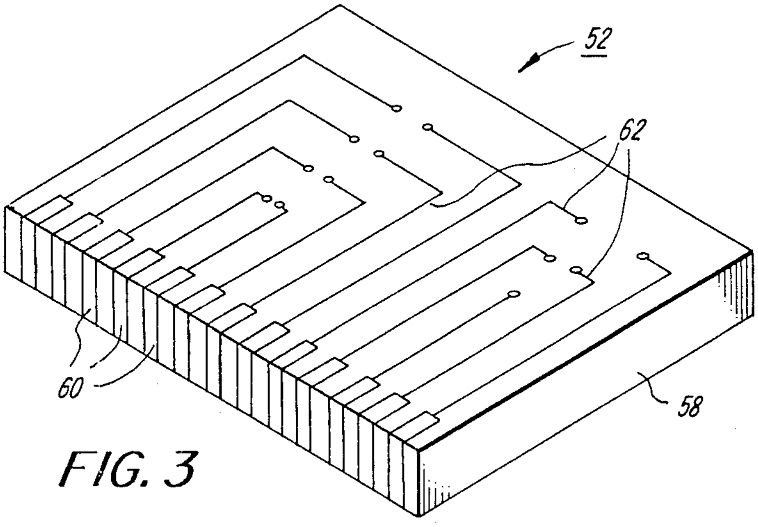
FIG. 3 is a perspective view showing the prior modulation sturcture incorporated in the devices of FIGS. 1 and 2.

In both FIGS. 1 and 2 a modulation structure 52 is located at the downstream ion modulation region adjacent one side of the respective channel (24, 34) through which the ion entraining transport fluid exits the respective housing (10, 32). A protective insulating layer 53 is disposed between the conductive elements of the modulation structure 52 and the conductive housing 10 of FIG. 1. Similarly, a dielectric layer 53*a* is sandwiched between the modulation structure 52 and the dielectric housing 32 of FIG. 2. Adjacent the opposite side of the respective channel is a conductive reference electrode 54 connected to a reference potential source 56, such as ground. As clearly illustrated in FIG. 3, the modulation structure 52 comprises an insulating supporting surface such as, for example, a phenolic printed circuit (PC) board 58 upon which are carried an array of modulation electrodes 60, each connected, by suitable electrical interconnection traces 62, through a switch 64 to a low voltage potential source 66, on the order of 5 to 15 volts DC.

The modulation electrodes are bent around a 90° corner. Photofabrication procedures for forming the electrodes 60 around this sharp corner are difficult and becomes increasingly more complex as the resolution of the modulation electrodes is increased, as is required by smaller feature sizes. Techniques, such as rounding of the sharp 90° corner of the PC board, dip coating the photoresist and using a highly collimated light source have enabled the photofabrication of modulation electrode arrays having 200 electrodes per inch. However, these techniques increase production costs because they are difficult and time consuming, entailing extra production steps and special material requirements. "Pushing" the resolution to 400 lines per inch would be an extremely difficult task.

In FIGS. 4 through 9, two forms of the improved ion modulation electrode structures, of the present invention, are illustrated. The following description will primarily discuss the modulation structures. Reference to the ion generation portions of the devices will be made, as necessary, by means of the numerals set forth in the description of FIGS. 1 and 2.

Figure 4:
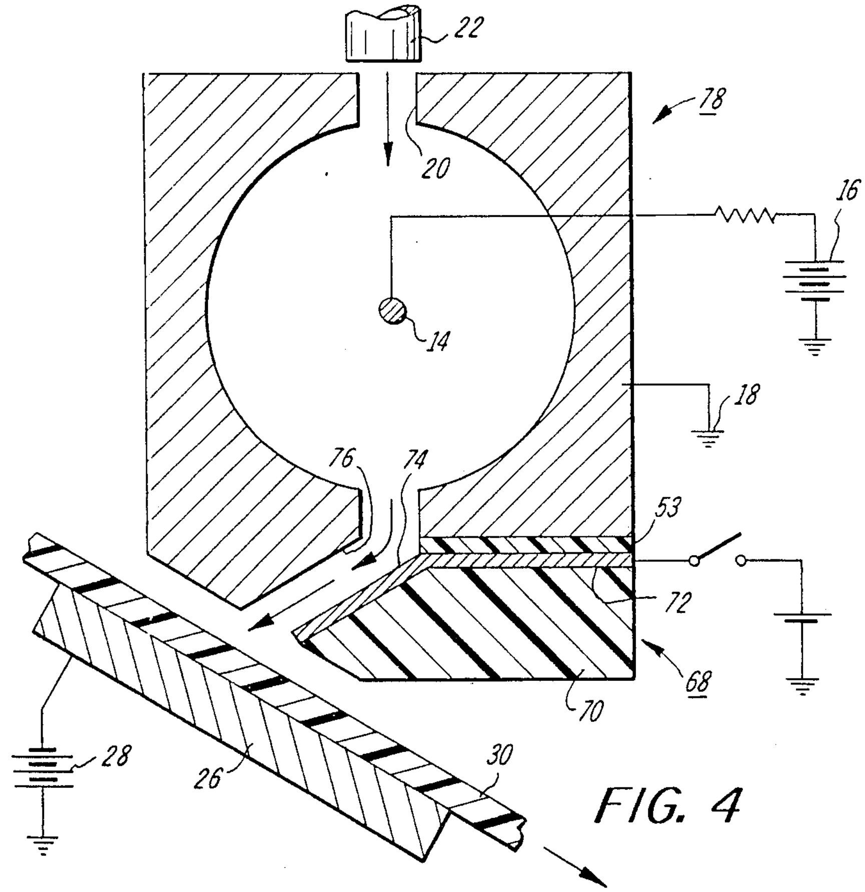
FIG. 4 is a partial cross-sectional elevation view showing a slightly nonplanar modulation structure and the bent transport fluid channel incorporated in an ion projection printing device of the FIG. 1 type.
Figure 5:
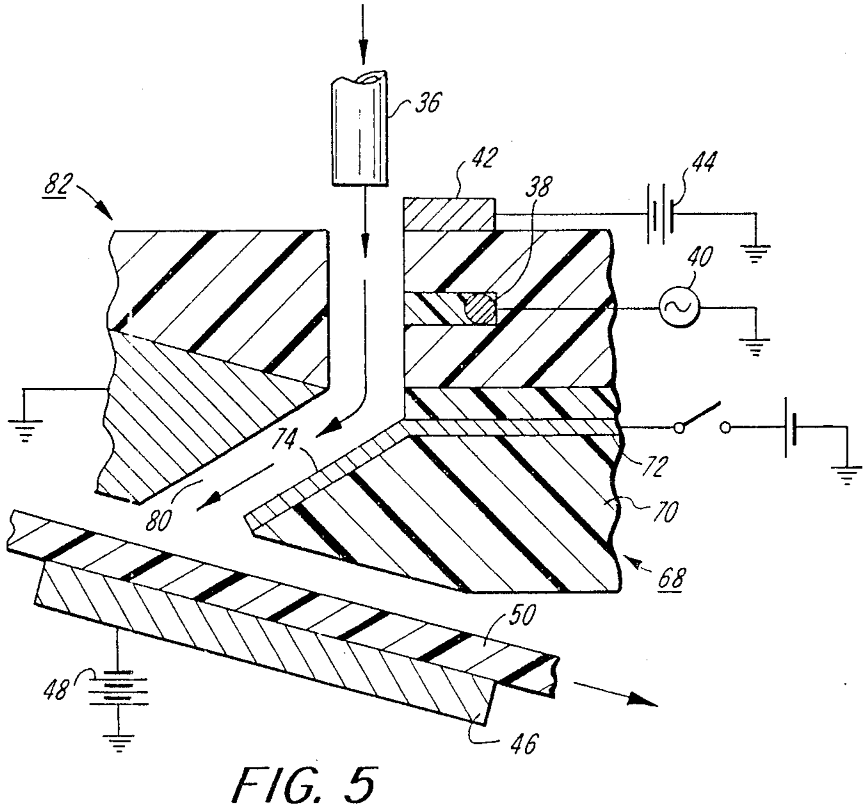
FIG. 5 is a partial cross-sectional elevation view showing a slightly nonplanar modulation structure and the bent transport fluid channel incorporated in an ion projection printing device of the FIG. 2 type.
Figure 6:
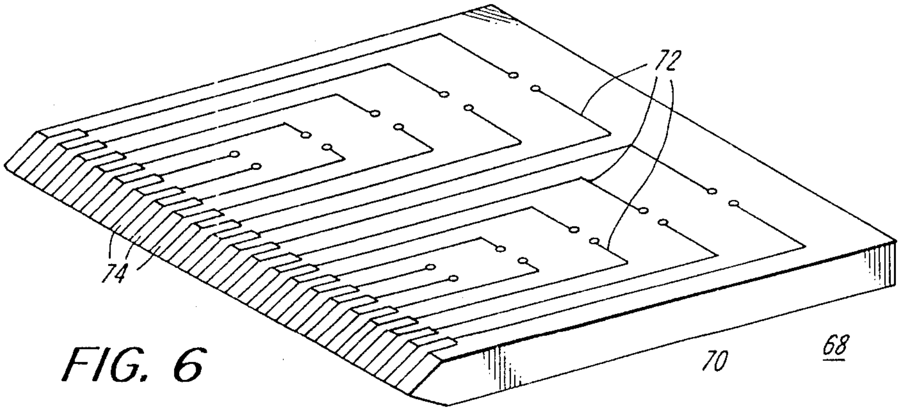
FIG. 6 is a perspective view of the slightly bent modulation structure incorparated in the devices of FIGS. 4 and 5.

While it would appear that a bent channel having abrupt turns would cause air transported ions to impact the conductive wall surfaces at the turns and become neutralized, this is not the case if the parameters of the housing design, the type of transport fluid and fluid velocity are selected to maintain laminar flow. Thus, it is not necessary that the ion entraining fluid transport channel define a straight path, if the fluid flow is always laminar. Turbulent flow is to be avoided as it is highly lossy. In laminar flow, except for a gradual migration of ions toward the walls, due to space charge effects (in the FIGS. 4 and 7 unipolar embodiments), the ions will travel with the transport fluid in the bent, or even serpentine, path without substantial loss to the conductive portions of the channel. It is expected that the rate of loss of ions to the walls will be simply proportional to the length of the channel, and not dependant upon the shape of its path, as long as laminar flow is maintained. By bending the fluid stream, the ion modulation electrodes may be straightened, resulting in ease of their fabrication and substantial improvement in the resolution of very high density arrays. In the embodiments of FIGS. 4 and 5, incorporating the novel ion modulation electrode structure 68, illustrated in FIG. 6, includes a planar insulating substrate 70 bearing suitable interconnect traces 72. Lying in its plane, and slightly bent, by about 30°, modulation electrodes 74. Thus, the channel 76, within the housing 78 (FIG. 4), and the channel 80, within the housing 82 (FIG. 5), are each bent at an abrupt angle of about 60° prior to entering their respective ion modulation regions. To accommodate the bending of the channels, each housing must be modified to rake back the channel wall opposite the modulation electrodes. This is a simple task and may easily be accomplished by standard machining techniques.

It should be note that the transport fluid will impinge upon the charge receptor at an oblique angle. This will not present a problem with respect to the ion deposition upon the charge receptor (30, 50), since as soon as the ions pass out of the influence of the modulation electrodes 74 within the channel (76, 80), and come under the high field influence of the accelerating backing electrode (26, 46), they will be drawn out of the transport stream and attracted in a normal direction toward the charge receptor.

It has been found experimentally that PC boards with modulation electrodes extending around the 30° angle can be fabricated using photolithographic techniques that are fairly conventional. For example, the photoresist could be spin coated or dip coated on both the flat surface and the angled edge in the same operation. Similarly, dry photoresists could be laminated on both surface in a single pass. Then, with a collimated light source being used to expose the photoresist through a flat mask, containing the modulating electrode array as well as the trace circuitry, no significant loss of resolution will occur on the angled surface. It is important that the electrode array pattern be disposed upon a uniformly smooth polished surface. To this end, epoxy fiberglass PC board substrate were found not to be acceptable since the polishing of the 30° angled surface caused indentations in areas of the fiberglass reinforcement. A fairly dense substrate material is required. One material found satisfactory is a laminated material used for door panels and manufactured by the Wilson Art company. It consists of melamine-impregnated paper pressed over multiple layers of phenolic-treated kraft papers at pressures exceeding one-half ton and temperatures of about 300+ F.

The fabrication process for the ion modulation structure included the following steps: first, the required agnle is ground and polished on the PC board substrate; next a thin copper layer is plated on the flat and angled surfaces simultaneously; then a photoresist is coated over the copper, is exposed through a suitable mask with a suitable light source, is developed and is finally etched leaving the desired pattern of copper on the substrate.

Figure 7:
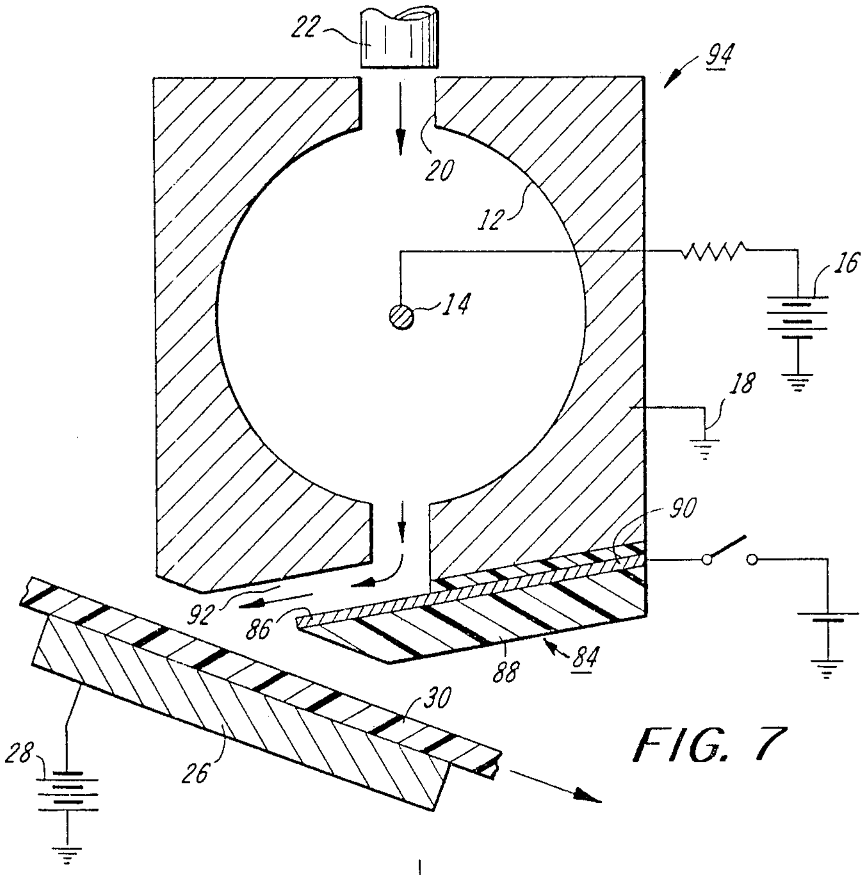
FIG. 7 is a partial cross-sectional elevation view showing a planar modulation structure and the bent transport fluid channel incorporated in an ion projection printing device of the FIG. 1 type.
Figure 8:
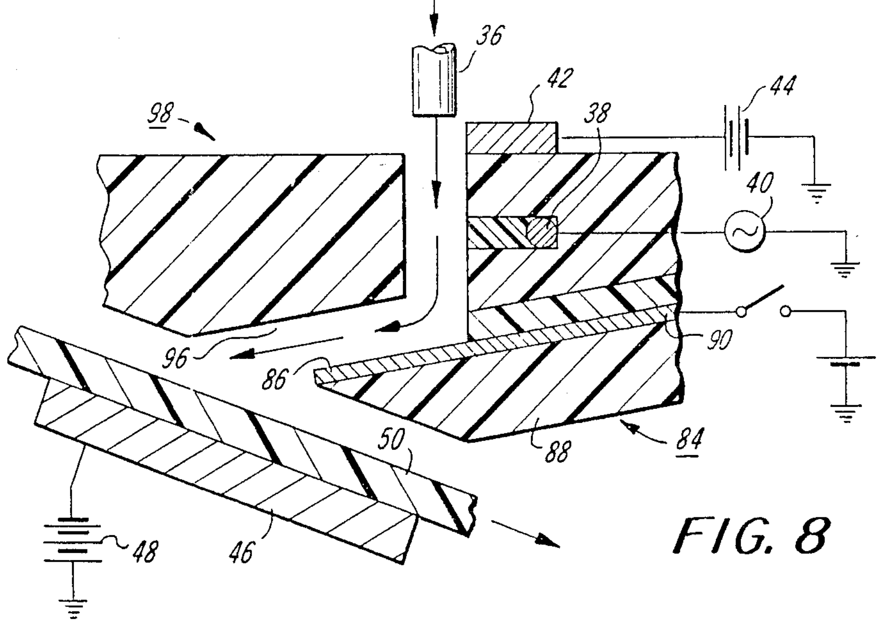
FIG. 8 is a partial cross-sectional elevation view showing a planar modulation structure and the bent transport fluid channel incorporated in an ion projection printing device of the FIG. 2 type.
Figure 9:
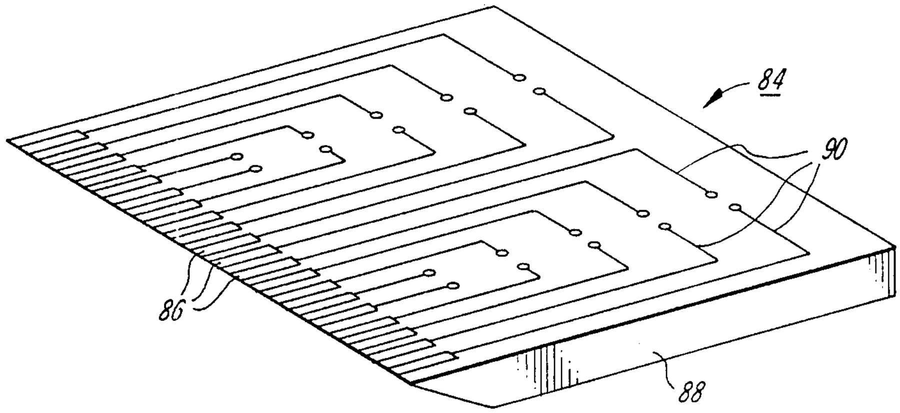
FIG. 9 is a perspective view of the planar modulation structure incorporated in the devices of FIGS. 7 and 8.

While a 30° bend in the electrode array structure is perhaps the largest practical angle which will allow ease of fabrication by standard techniques and high resolution, for forming dense arrays up to about 400 electrodes per inch, it is beleived that an angle as great a 45° may be used. In FIGS. 7, 8 and 9 the modulation electrode array structure 84 takes its simplest form. The electrodes 86 are fabricated on the flat surface of the PC board 88 along with the interconnect traces 90, and require no bending at all. Of course, this construction allows for the simplest and most straightforward processing. It has the further advantages that standard PC board substrates may be used and that substrates having copper layer precoated thereon may be purchased and used. The remaining processing steps necessary for forming the electrode array and the interconnect traces would be the same as that set forth above.

When using the planar modulation electrode structure 84 it will be observed that the bent channel 92 in housing 94 (FIG. 7) and channel 96 in housing 98 (FIG. 8) will be exceedingly abrupt. Nevertheless, as long as laminar flow of the transport fluid is maintained, there will be very little loss of ion output current.

Figure 10:
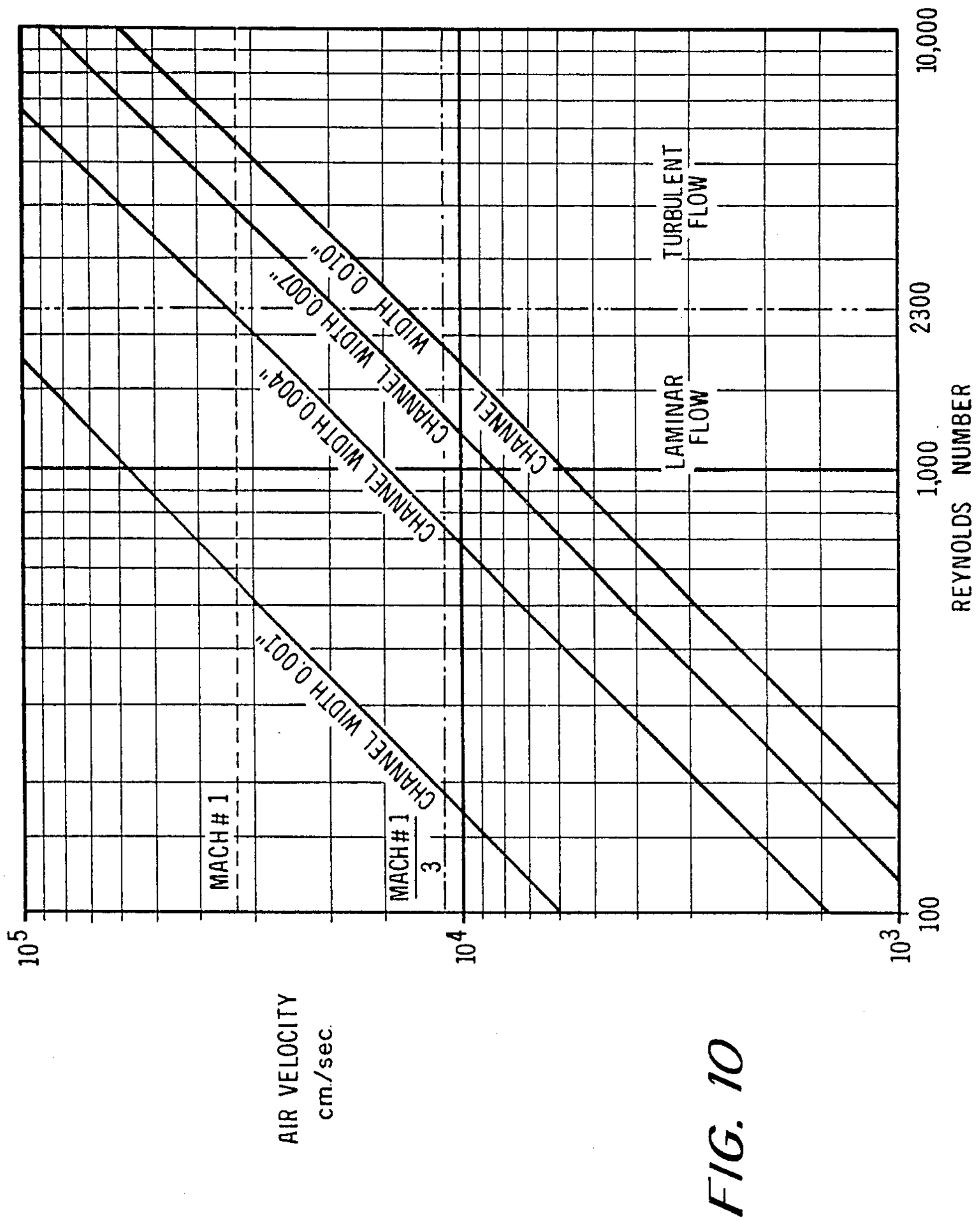
FIG. 10 is a graph illustrating the parametric interrelationships for laminar flow.

Generally, air flow through a simple narrow slit, or channel, will undergo a transition from laminar flow to turbulent flow at a Reynolds Number of about 2300. The graph of FIG. 10 shows curves for channels of different width plotted against Reynolds Number and air velocity (cm/sec). Given that the air velocity of interest is in the vicinity of $1\times 10_4$cm/sec (about one-third the speed of sound), it can be seen that the largest possible channel width, at that velocity in the laminar flow region, would be about 11 or 12 mils. Wider channels, operated at that air speed, would result in turbulent flow therethrough, resulting in substantial output current loss as ions repeatedly contact the channel walls and become neutralized. It should be apparent that another drawback of large channel widths is that more power is required in order to pump air therethrough at the same velocity as through the narrower channels. Optimally, channels of about 3 to 5 mils wide are desirable from the standpoint of resolution and power consumption requirements. At the air velocity of interest, laminar flow conditions will prevail for channel widths of that magnitude.

Comparing the current output obtainable from the bent channel embodiments with that obtainable from the straight channel embodiments it is found that very little penalty is paid for achieving an overwhelming fabrication simplicity. An electrometer, comprising a conductive plate placed a distance of about 1/16 inch from the channel exit of the device being tested, was used to measure the total ion output current. The plate was maintained at a negative potenital of 600 volts DC and the collected current output was measured on a Keithly Model #480 Picoammeter. The head design with the air channel bent about 80° (FIG. 7) measured about 10% less output current than the straight through air path of FIG. 1, while the output current loss of the design with the air channel bent about 60°(FIG. 4) was somewhat less than 10%

Air flow assisted ion projection, carried out in accordance with the present invention, is capable of achieving acceptable performance while rendering fabrication substantially simpler and less expensive. It should be understood that the present disclosure has been made only by way of example and that numerous changes in details of construction and the combination and arrangement of parts may be resorted to without departing from the true spirit and the scope of the invention as herein after claimed.

What is claimed is:

1. A fluid jet assisted electrographic marking apparatus for placing electrostatic charges upon a charge receptor in an image-wise pattern, said apparatus being characterized by including housing means including an upstream, ion generation region and a downstream, ion modulation region, means for supplying a transport fluid to said housing, means for delivering the transport fluid to said housing at a location upstream of said ion generation region for entraining ions in the fluid path and moving them with fluid, a channel in said housing for receiving the transport fluid from said ion generation region and for directing the transport fluid and entrained ions through said ion modulation region, said channel defining a bent path and being of a width such that laminar flow of the transport fluid will prevail therethrough, and ion modulation means, located at said ion modulation region, including an array of electrically conductive modulating electrodes located on one side of said channel, at a position downstream of its bend, and disposed upon a substantially planar substrate, said electrodes including a first portion extending in the plane of said substrate and a second portion departing from the plane of said substrate by an angle of less than 45°, a conductive member on the side of said channel opposite to said modulating electrodes, a source of modulating potential, switch means for selectively connecting said source of modulating potential to each of said modulating electrodes, and a source of reference potenital connected to said conductive member, whereby each of said modulating electrodes controls the passage of a beam of ions out of said bent path channel, when its respective switch is energized.

2. The fluid jet assisted electrographic marking aparauts as defined in claim 1 characterized in that said substrate also supports interconnect means thereon extending between said electrodes and said switch means.

3. The fluid jet assisted electrographic marking apparatus as defined in claim 1 characterized in that said second electrode portion departs from the plane of said substrate by an angle of 0°.

4. The fluid jet assisted electrographic marking apparatus as defined in claim 1 characterized in that said second electrode portion departs from the plane of said substrate by an angle of 30°.

5. The fluid jet assisted electrographic marking apparatus as deined in claim 3 characterized in that said second electrode portion is substantially coextensive with the length of said bent path channel downstream of said bend.

* * * * *

UNITED STATES PATENT AND TRADEMARK OFFICE

CERTIFICATE OF CORRECTION

PATENT NO. : 4,524,371

DATED : June 18, 1985

INVENTOR(S) : Nicholas K. Sheridon & Michael A. Berkovitz

It is certified that error appears in the above-identified patent and that said Letters Patent are hereby corrected as shown below:

Column 6, line 24, the word "the" should be inserted before the word "fluid ".

Signed and Sealed this

*Twenty-fourth* Day of *September 1985*

[SEAL]

*Attest:*

DONALD J. QUIGG

*Attesting Officer*

*Commissioner of Patents and Trademarks—Designate*